United States Patent
Ohno et al.

(10) Patent No.: US 7,018,598 B2
(45) Date of Patent: Mar. 28, 2006

(54) PROCESS FOR PRODUCING NITROGEN TRIFLUORIDE

(75) Inventors: Hiromoto Ohno, Kawasaki (JP); Toshio Ohi, Kawasaki (JP)

(73) Assignee: Showa Denko K.K., Tokyo (JP)

( * ) Notice: Subject to any disclaimer, the term of this patent is extended or adjusted under 35 U.S.C. 154(b) by 233 days.

(21) Appl. No.: 10/030,682

(22) PCT Filed: May 11, 2001

(86) PCT No.: PCT/JP01/03963

§ 371 (c)(1), (2), (4) Date: Jan. 14, 2002

(87) PCT Pub. No.: WO01/85603

PCT Pub. Date: Nov. 15, 2001

(65) Prior Publication Data

US 2003/0017098 A1    Jan. 23, 2003

Related U.S. Application Data

(60) Provisional application No. 60/230,792, filed on Sep. 7, 2000.

(30) Foreign Application Priority Data

May 12, 2000 (JP) .............................. 2000-139846

(51) Int. Cl.
*C01B 21/083* (2006.01)

(52) U.S. Cl. ...................................... 423/406; 423/470
(58) Field of Classification Search ................ 423/406, 423/470
See application file for complete search history.

(56) References Cited

U.S. PATENT DOCUMENTS

| | | | | |
|---|---|---|---|---|
| 3,304,248 A | * | 2/1967 | Fullam et al. | 423/406 |
| 4,091,081 A | * | 5/1978 | Woytek et al. | 423/406 |
| 4,543,242 A | * | 9/1985 | Aramaki et al. | 423/406 |
| 5,637,285 A | * | 6/1997 | Coronell et al. | 423/406 |
| 6,183,713 B1 | * | 2/2001 | Tokunaga et al. | 423/406 |

FOREIGN PATENT DOCUMENTS

| | | |
|---|---|---|
| JP | 02255512 A | 10/1990 |
| JP | 02255513 A | 10/1990 |
| JP | 03170307 A | 7/1991 |
| JP | 05105411 A | 4/1993 |

OTHER PUBLICATIONS

Abstract of Japanese 355116624A, Sep. 8, 1980.*
Abstract of European 000345354A1, Dec. 13, 1989.*

* cited by examiner

*Primary Examiner*—Wayne A. Langel
(74) *Attorney, Agent, or Firm*—Sughrue Mion, PLLC

(57) ABSTRACT

$F_2$ gas is reacted with $NH_3$ gas in a gaseous phase at 80° C. or less in the presence of a diluting gas to produce $NF_3$. Thus, $NF_3$ is produced with good safety, efficiency and profitability.

8 Claims, No Drawings

PROCESS FOR PRODUCING NITROGEN TRIFLUORIDE

CROSS-REFERENCE TO RELATED APPLICATION

This application is an application filed under 35 U.S.C. § 111(a) claiming benefit pursuant to 35 U.S.C. § 119(e)(1) of the filing date of the Provisional Application 60/230,792 filed Sep. 7, 2000, pursuant to 35 § 111(b).

TECHNICAL FIELD

The present invention relates to a process for producing nitrogen trifluoride (hereinafter it may be referred to as "$NF_3$"), comprising directly reacting fluorine gas ($F_2$) with ammonia gas ($NH_3$) in a gaseous phase and the use thereof.

BACKGROUND ART $NF_3$ is used as a dry etching gas or the like in, for example, the production of semiconductor devices and, in general, the processes for producing $NF_3$ are roughly classified into chemical processes and electrolytic processes.

Known examples of chemical processes include:

(1) a method of blowing $F_2$ gas and $NH_3$ gas into fused acidic ammonium fluoride (see, Japanese Examined Patent Publication No. 55-8926, JP-B-55-8926), (2) a method of reacting a metal fluoride ammonium complex in a solid form with $F_2$ gas (see, Japanese Examined Patent Publication No. 60-71503, JP-B-60-71503), and (3) a method of directly reacting $F_2$ gas with $NH_3$ gas (see, Japanese Unexamined Patent Publication No. 2-255513, JP-A-2-255513).

On the other hand, known examples of the electrolytic process using fused acidic ammonium fluoride as an electrolyte include:

(4) a method of performing electrolysis using graphite as an anode, and (5) a method of performing electrolysis using nickel as an anode.

In addition, Ruff et al. have reported that, using the chemical process of reacting $F_2$ with $NH_3$ in a gaseous phase, $NF_3$ can be synthesized, though the yield is as low as 5% or less (see, *Z. anorg. allg. Chem.*, 197, 395 (1931)). Also, Morrow et al. have reported that $NF_3$ was synthesized similarly in a gaseous phase (see, *J. Amer. Chem. Soc.*, 82, 5301 (1960)).

However, in the conventional direct fluorination process of synthesizing $NF_3$ from $NH_3$ as the reaction substrate using $F_2$ gas, the $F_2$ gas used is very highly reactive, therefore, explosion or corrosion may occur between the substrate and $F_2$ gas. Furthermore, these reactions incur generation of a large amount of heat of reaction to increase the temperature in the reactor, as a result, the yield disadvantageously decreases due to decomposition of the product $NF_3$ or due to the generation of $N_2$, HF or $NH_4F$ by the side reactions. The method described in JP-A-2-255513 has a problem in that $NF_3$ is produced using $F_2$ gas in 3 to 20 times based on $NH_3$, where the reactor temperature is kept at 80 to 250° C. within a heat medium, therefore, the yield based on the $F_2$ is low and the profitability is low.

In the direct fluorination method using $F_2$ gas, heat of reaction of about −110 kcal/mol is generated when one hydrogen in the substrate is displaced by one fluorine. Therefore, in the case of producing $NF_3$ by reacting $F_2$ with $NH_3$, heat of reaction of about −330 kcal/mol is generated upon displacement of hydrogen with fluorine and this generation of heat readily causes breakage of the N—F bond or explosion and moreover decreases the yield, giving rise to problems in the production.

DISCLOSURE OF INVENTION

The present invention has been made under these circumstances and the object of the present invention is to provide a process for producing $NF_3$ with good safety, efficiency and profitability industrially in the direct fluorination method of producing $NF_3$ by reacting a substrate ($NH_3$) with $F_2$ gas.

As a result of extensive investigations to solve the above-described problems, the present inventors have found that, in the process of producing $NF_3$ by reacting $F_2$ gas with $NH_3$ gas, when the reaction is performed at 80° C. or less in the presence of a diluting gas, $NF_3$ can be produced with a high yield. The present invention has been accomplished based on this finding.

Thus, the present invention provides a process for producing $NF_3$, and a use of the $NF_3$ obtained, as described in (1) to (13) below.

(1) A process for producing nitrogen trifluoride, comprising reacting fluorine gas with ammonia gas in a gaseous phase, wherein the reaction is performed at 80° C. or less in the presence of a diluting gas.

(2) The process as described in (1) above, wherein the reaction temperature is 50° C. or less.

(3) The process as described in (1) or (2) above, wherein the concentrations of fluorine gas and ammonia gas fed are from 1:1 to 1:2 in terms of the molar ratio.

(4) The process as described in any one of (1) to (3) above, wherein fluorine gas and/or ammonia gas is fed in portions.

(5) The process as described in any one of (1) to (4) above, wherein the concentration of fluorine gas fed is 3 mol % or less.

(6) The process as described in any one of (1) to (5) above, wherein the concentration of ammonia gas fed is 6 mol % or less.

(7) The process as described in any one of (1) to (6) above, wherein the diluting gas is at least one selected from the group consisting of nitrogen, helium, argon, hexafluoroethane and octafluoropropane.

(8) The process as described in any one of (1) to (7) above, wherein the diluting gas is reused by circulation.

(9) The process as described in any one of (1) to (8) above, wherein a step of treating unreacted fluorine gas is provided and, in the step, unreacted fluorine gas is treated with an aqueous alkali solution and/or alumina.

(10) The process as described in (9) above, wherein the treatment step is performed at 80° C. or less.

(11) A nitrogen trifluoride product comprising the nitrogen trifluoride obtained by the process described in any one of (1) to (10) above.

(12) An etching gas comprising the nitrogen trifluoride product described in (11) above.

(13) A cleaning gas comprising the nitrogen trifluoride product described in (11) above.

That is, the present invention provides "a process for producing nitrogen trifluoride, comprising reacting fluorine gas with ammonia gas in a gaseous phase, wherein the reaction is performed at 80° C. or less in the presence of a diluting gas", "a nitrogen trifluoride product comprising the nitrogen trifluoride obtained by the production process described above", and "an etching gas and a cleaning gas each comprising the nitrogen trifluoride product described above".

BEST MODE FOR CARRYING OUT THE INVENTION

The present invention is described in detail below.

The present invention provides a process for producing $NF_3$ by directly (non-catalytically) reacting $F_2$ gas with $NH_3$ gas in a gaseous phase at 80° C. or less in the presence of a diluting gas, where the problems in conventional direct fluorination reaction techniques can be solved and $NF_3$ can be industrially produced with good safety, efficiency and profitability.

As described above, the direct fluorination method using $F_2$ gas incurs generation of heat of reaction as large as about −110 kcal/mol when one hydrogen in the substrate is displaced by one fluorine.

In the case of producing $NF_3$ by reacting $F_2$ gas with $NH_3$ gas, a heat of reaction of about −330 kcal/mol is generated only by the displacement of hydrogen by fluorine, and the local temperature increases in many cases. When the temperature is high, a side reaction as shown below by Formula 2 predominantly takes place in addition to the objective reaction as shown below by Formula 1.

$$4NH_3 + 3F_2 \rightarrow NF_3 + 3NH_4F \quad \text{(Formula 1)}$$

$$2NH_3 + 3F_2 \rightarrow N_2 + 6HF \quad \text{(Formula 2)}$$

Accordingly, it is necessary to control the side reaction (Formula 2) and selectively promote the objective reaction (Formula 1). As a result of extensive investigations to solve this problem, the present inventors have found that there is a close relationship between the reaction temperature and the side reaction. If the reaction temperature is 80° C. or more, for example, 110° C., the side reaction (Formula 2) predominantly proceeds and only nitrogen and hydrogen fluoride are produced but the objective $NF_3$ is scarcely produced. When the reaction temperature is lowered to 80° C. or less, the objective reaction (Formula 1) selectively proceeds. That is, the reaction temperature in the process of the present invention is 80° C. or less, preferably 50° C. or less. When the reaction system is further cooled, the objective reaction (Formula 1) proceeds more selectively, however, if the reaction temperature is too low, the reaction rate is also excessively decreased and, depending on the case, the diluting gas may be condensed. Accordingly, the lower limit of the temperature may suitably be −30° C.

For the cooling, a method of circulating the gas using, for example, a jacket system or a coil system may be preferred. Depending on the case, for example, stirring or the like may be used to render the temperature in the reactor uniform. The large heat of reaction is preferably eliminated to prevent a rise in the local temperature.

In order to prevent the local temperature from the rising due to heat of reaction, the starting materials $F_2$ and $NH_3$ are preferably fed in portions when the concentrations thereof are high from the standpoint of preventing a rise in the local temperature, though the starting material gases each may be fed in one lot when the concentration thereof is low. In the case of feeding $F_2$ gas and $NH_3$ gas as the starting materials in portions, for example, a method of passing $F_2$ gas and $NH_3$ gas through a first inlet for feeding starting material gas and passing $NH_3$ gas through a second inlet for feeding gas may be used. By feeding the gases in portions as such, the reaction temperature can be more effectively prevented from rising locally.

In the direct fluorination reaction using $F_2$ gas, generation of a large amount of heat accompanies the reaction as described above. For preventing this generation of heat, a method of diluting $F_2$ gas with an inert gas, a method of diluting $NH_3$ gas as the substrate with an inert gas and the like may be used. The diluting gas is preferably at least one inert gas selected from the group consisting of nitrogen, helium, argon, hexafluoroethane and octa-fluoropropane. In taking account of the operation of separating and thereby purifying the objective $NF_3$ (boiling point: −120° C.) from the inert gas in the distillation process, hexafluoroethane (boiling point: −78.1° C.) and octafluoropropane (boiling point: −36.7° C.) each having a high boiling point as compared with $NF_3$ are advantageous in view of the cost for separation. Among these, octafluoropropane is more preferred.

In introducing the gases into a reactor, either one or both of $F_2$ gas and $NH_3$ gas is preferably diluted with a diluting gas and then introduced into the reactor. In taking account of safety, $F_2$ gas and $NH_3$ gas both are preferably diluted with a diluting gas to a lower concentration. The diluting gas separated from the product $NF_3$ is preferably recovered and used by circulating it. For the recovery of the diluting gas, a distillation separation method may usually be used. For example, in the case of using octafluoropropane as the diluting gas, the objective $NF_3$ is extracted from the top of the distillation tower as a low boiling fraction and octafluoropropane as the diluting gas is extracted from the bottom of the distillation tower and used by circulating it in the reaction system.

In practicing the reaction of the present invention, the concentrations of both $F_2$ gas and $NH_3$ gas fed as the starting materials are preferably in the range of 1:1 to 1:2 in terms of the molar ratio. Even in the case of feeding the starting materials in portions, the ratio of $F_2$ gas to $NH_3$ gas used in the whole reaction is preferably within this range. If the molar ratio of $NH_3$ gas to $F_2$ gas is more than two times, equipment or the like for recovering unreacted ammonia gas is necessary and this is not profitable, whereas if it is less than one time, unreacted fluorine gas remains in a large amount and this is disadvantageous from the point of view of safety or profitability.

The concentration of $F_2$ gas fed is preferably 3 mol % or less and the concentration of $NH_3$ gas fed is preferably 6 mol % or less. Accordingly, the gas composition fed at the reactor inlet preferably contains 9 mol % or less of the reaction substrate ($F_2 + NH_3$) and 91 mol % or more of the diluting gas. As described above, in the direct fluorination method using $F_2$ gas, $F_2$ gas used is highly reactive, therefore, $NH_3$ containing hydrogen may undergoing combustion or explosion when exposed to fluorine. Therefore, the important point of the present invention is to prevent the explosion of $NH_3$ gas and $F_2$ gas. The present inventors have studied on the range of explosive conditions for $NH_3$ gas and $F_2$ gas, as a result, the lower limit of the range of conditions for explosion of $NH_3$ is found to be 6 mol % or less and from this, the safe range of the reaction in the process of the present invention can be established. Furthermore, by feeding $F_2$ gas and/or $NH_3$ gas in portions from two or more gas inlets into the reactor, the gas concentration in the reactor can be controlled to be in a safe range.

Unreacted $F_2$ gas has a safety problem at the time of concentration or the like in the distillation process and must be removed to the utmost. Therefore, the process for producing $NF_3$ of the present invention contains a step of treating the unreacted $F_2$ gas. For removing $F_2$ gas, a method of contacting the gas with an aqueous alkali solution, for example, an aqueous KOH solution or a method of removing F$_2$ gas by contacting it with alumina is preferably used. The treating temperature is preferably 80° C. or less. If it exceeds 80° C., some of the objective NF$_3$ may be disadvantageously decomposed.

In the process of producing NF$_3$ by the direct fluorination reaction of F$_2$ gas and NH$_3$ gas, NH$_4$F is produced as by-product as described above (Formula 1). Therefore, the reaction is preferably performed by employing, for example, a system where two reactor units are used and, by changing over the units, the by-product NH$_4$F is recovered and reused.

The NF$_3$ obtained by the production process of the present invention can be used as an etching gas in an etching step during production of a semiconductor device. Also, NF$_3$ can be used as a cleaning gas in a cleaning step during production of a semiconductor device. In production of a semiconductor device such as an LSI and a TFT, after forming a thin film or a thick film by CVD, sputtering, evaporation or the like, etching is performed to form a circuit pattern. Furthermore, in an apparatus for forming a thin film or a thick film, cleaning is performed to remove unnecessary deposits accumulated on the inner wall of the apparatus, a jig and the like. This is performed because unnecessary deposits cause generation of particles. For producing a good quality film, cleaning must be performed on occasion.

The etching using NF$_3$ may be performed under various dry etching conditions such as plasma etching and microwave etching, and NF$_3$ can be used by mixing it with an inert gas such as He, N$_2$ and Ar, or with a gas such as HCl, O$_2$ and H$_2$, in an appropriate proportions.

The present invention is further illustrated below by referring to the Examples and Comparative Examples, however, the present invention is not limited to these examples.

EXAMPLE 1

An Inconel 600-type reactor having an inside diameter of about 40 mmϕ and a length of 500 mm (a reactor of a jacket type using a refrigerant circulating cooling system, the reactor being subjected to a passivation treatment with F$_2$ gas at a temperature of 400° C.), was used and the reactor was cooled to 5° C. while feeding argon gas at 29.58 Nl/hr (fed in equivalent from each of the NH$_3$ feeding line and the F$_2$ feeding line). Thereafter, NH$_3$ gas and F$_2$ gas were fed at 0.701 Nl/hr and 0.526 Nl/hr, respectively, to perform the reaction. The NH$_3$ concentration and the F$_2$ concentration at the reactor inlet were 2.28 mol % and 1.71 mol %, respectively. Two hours after the initiation of the reaction, the concentrations of hydrogen fluoride and unreacted fluorine gas in the reaction product gas were measured using an aqueous potassium iodide solution and the composition was analyzed by gas chromatography. The analysis values are shown in Table 1. The yield of NF$_3$ on an F$_2$ basis was about 69%. In the Table, "ND" means "not detected".

TABLE 1

| Reaction Product Gas | Analysis Results |
|---|---|
| Unreacted NH$_3$ | ND |
| Unreacted F$_2$ | 0.033 NL/hr |
| NF$_3$ | 0.121 NL/hr |
| HF | ND |

EXAMPLE 2

A reaction and an analysis were performed under the same conditions and the same operation as in Example 1 except for using an Inconel 600-type reactor having an inside diameter of 40 mmϕ and a length of 500 mm (a reactor using a heating system by an electric heater; the reactor was subjected to a passivation treatment with F$_2$ gas at a temperature of 400° C.) and changing the reaction temperature to 70° C. The analysis results are shown in Table 2. The yield of NF$_3$ on an F$_2$ basis was about 42%.

TABLE 2

| Reaction Product Gas | Analysis Results |
|---|---|
| Unreacted NH$_3$ | ND |
| Unreacted F$_2$ | 0.112 NL/hr |
| NF$_3$ | 0.075 NL/hr |
| HF | 0.042 NL/hr |

COMPARATIVE EXAMPLE 1

A reaction and an analysis were performed under the same conditions and the same operation as in Example 1 except for using the same reactor as in Example 2 and changing the reaction temperature to 150° C. The analysis results are shown in Table 3. It was seen that at a high reaction temperature of 80° C. or more, NF$_3$ was not produced at all and only the reaction of Formula 2 proceeded.

TABLE 3

| Reaction Product Gas | Analysis Results |
|---|---|
| Unreacted NH$_3$ | ND |
| Unreacted F$_2$ | ND |
| NF$_3$ | ND |
| HF | 0.701 NL/hr |

EXAMPLE 3

A reaction and an analysis were performed under the same conditions and the same operation as in Example 1 except for using an Inconel 600-type reactor having an inside diameter of 40 mmϕ and a length of 500 mm (a reactor of jacket type using a refrigerant circulating cooling system) and feeding NH$_3$ in a two-part system of feeding the gas at two positions of the inlet part and the central part of the reactor. The analysis results are shown in Table 4. The yield of NF$_3$ on an F$_2$ basis was about 76%.

TABLE 4

| Reaction Product Gas | Analysis Results |
|---|---|
| Unreacted NH$_3$ | ND |
| Unreacted F$_2$ | 0.011 NL/hr |
| NF$_3$ | 0.133 NL/hr |
| HF | ND |

COMPARATIVE EXAMPLE 2

A reaction and an analysis was performed under the same conditions and the same operation as in Example 1 except for feeding NH$_3$ at 0.30 Nl/hr, F$_2$ gas at 1.05 Nl/hr and helium gas as a diluting gas at 36.7 Nl/hr. The analysis results are shown in Table 5. It was seen that when $NH_3$ gas was fed in a concentration of one times in mol or less based on 1 mol of $F_2$ gas, unreacted $F_2$ gas disadvantageously remained in a large amount.

TABLE 5

| Reaction Product Gas | Analysis Results |
|---|---|
| Unreacted $NH_3$ | ND |
| Unreacted $F_2$ | 0.825 NL/hr |
| $NF_3$ | 0.049 NL/hr |
| HF | ND |

COMPARATIVE EXAMPLE 3

A reaction and an analysis was performed under the same conditions and the same operation as in Example 1 except for feeding $NH_3$ gas at 1.58 Nl/hr, $F_2$ gas at 0.526 Nl/hr and helium gas as a diluting gas at 36.7 Nl/hr. The analysis results are shown in Table 6. It was seen that when $NH_3$ gas was fed in a concentration of two times in mol based on 1 mol of $F_2$ gas, unreacted $NH_3$ disadvantageously remained in a large amount.

TABLE 6

| Reaction Product Gas | Analysis Results |
|---|---|
| Unreacted $NH_3$ | 0.867 NL/hr |
| Unreacted $F_2$ | 0.010 NL/hr |
| $NF_3$ | 0.119 NL/hr |
| HF | ND |

INDUSTRIAL APPLICABILITY

As described above, according to the present invention, $NF_3$, which was heretofore difficult to produce with a high yield, can be produced with a good yield. Furthermore, the $NF_3$ produced by the process of the present invention can be used as an etching gas or a cleaning gas.

The invention claimed is:

1. A process for producing nitrogen trifluoride, comprising reacting fluorine gas with ammonia gas in a gaseous phase, wherein the reaction is performed at 70° C. or less in the presence of a diluting gas, wherein the concentration of fluorine gas fed is 3 mol % or less and the concentration of ammonia gas fed is 6 mol % or less, wherein at least the fluorine gas is fed in portions from two or more gas inlets or the ammonia gas is fed in portions from two or more gas inlets.

2. The process as claimed in claim 1, wherein the reaction temperature is 50° C. or less.

3. The process as claimed in claim 1 or 2, wherein the concentrations of fluorine gas and ammonia gas fed are from 1:1 to 1:2 in terms of the molar ratio.

4. The process as claimed in claim 1 or 2, wherein the diluting gas is at least one selected from the group consisting of nitrogen, helium, argon, hexafluoroethane and octafluoropropane.

5. The process as claimed in claim 1 or 2, wherein the diluting gas is reused by circulation.

6. The process as claimed in claim 1 or 2, wherein a step of treating unreacted fluorine gas is provided and in the step, unreacted fluorine gas is treated with an aqueous alkali solution and/or alumina.

7. The process as claimed in claim 6, wherein the treatment step is performed at 80° C. or less.

8. The process as claimed in claim 1 or 2, wherein the ammonia gas is fed in portions from two or more gas inlets.

* * * * *